May 16, 1939.  H. JUNGHANS  2,158,723
MEANS FOR CONTROLLING PENDULUM CLOCKS
Original Filed Nov. 26, 1935
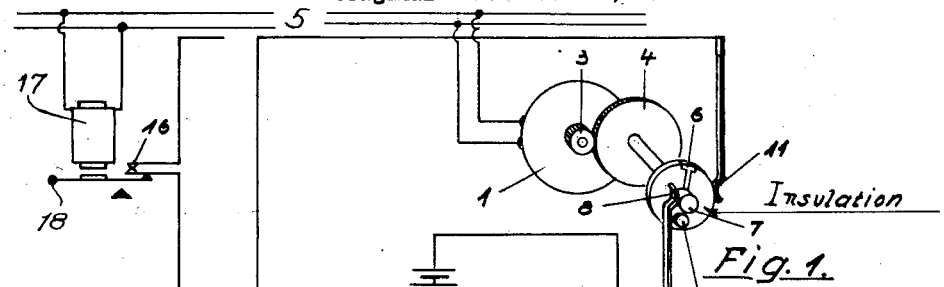
Fig. 1.
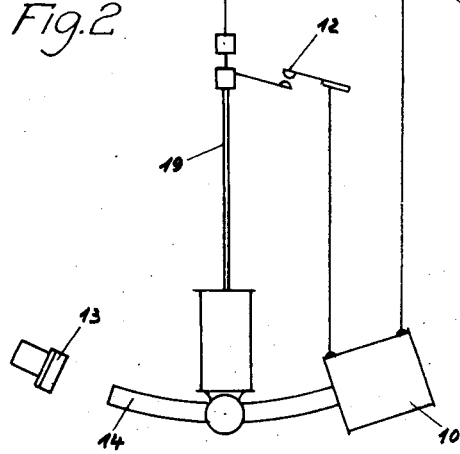
Fig. 2
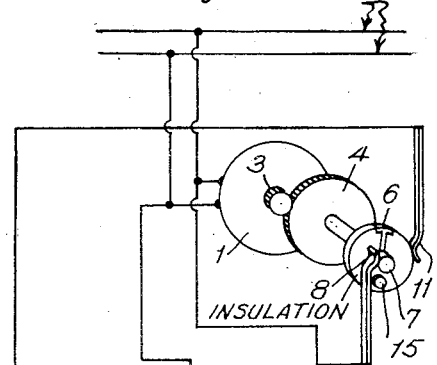
Fig. 3.
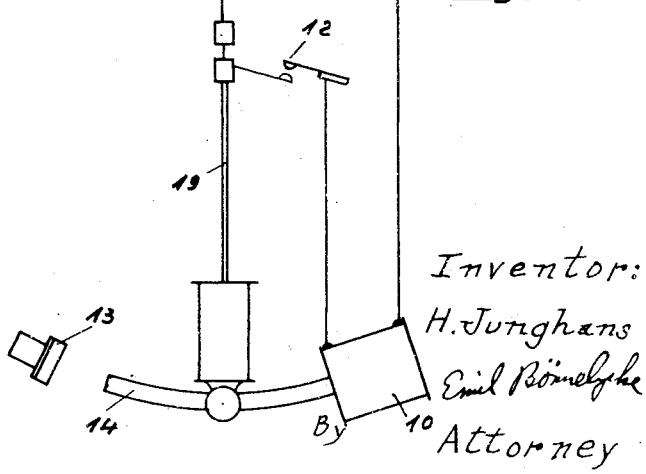
Inventor:
H. Junghans
Emil Börnelyke
By Attorney Patented May 16, 1939

2,158,723

UNITED STATES PATENT OFFICE 2,158,723

MEANS FOR CONTROLLING PENDULUM CLOCKS

Helmut Junghans, Schramberg-Sulgen, Germany

Application November 26, 1935, Serial No. 51,669. Renewed April 5, 1939. In Germany December 1, 1934

2 Claims. (Cl. 58—26)

This invention relates to means for controlling pendulum clocks, which have their own mechanical or electrical driving mechanism, with the aid of synchronised alternating current.

A clock of this kind does not call for supervision, which is of considerable advantage particularly in the case of master clocks and clocks in which importance is attached to accuracy of rate. So long as the current in the mains is not interrupted the clock will be controlled in positive fashion. If the synchronising current ceases, the clock will be driven by a reserve of driving-power provided in the clock, and the control will be taken over by the ordinary controlling device, f.e. the pendulum, its accuracy being quite sufficient to give adequate control, as the small deviation during any short interruption in the current of the mains is not particularly important.

The arrangement according to the invention may be employed in conjunction with mechanical clocks for winding by hand or for electrical winding with weight or spring mechanism, or in conjunction with clocks with electrical pendulum drive. In this connection the clock does not require to possess a particularly high precision, and nevertheless with a control means according to the invention an accuracy of rate is obtained which is equal to that of a precision clock with compensating pendulum; or in other words, the deviations are not greater than the fluctuations in frequency in the alternating current mains, which in the case of properly synchronised mains will amount at the most to a very few seconds.

The control of the clock is effected in accordance with the invention by means of a self-starting synchronous motor, the rotor of which operates a contact wheel, the transmission of which is such that a contact is closed in respect of a battery circuit, for example every second.

There is fed by the battery circuit a coil (solenoid), which acts in such fashion on a magnet secured to a half-second pendulum that upon each closing of the circuit the permanent magnet on the pendulum is drawn into the coil.

On the pendulum there is also provided a second contact. If the current in the main were to cease, to commence again after a certain time, and if for example the pendulum were to swing towards the opposite side, i. e., away from the solenoid, and not in accordance with the synchronisation impulses, the synchronous motor at the same time giving contact in respect of the battery circuit, a braking action would be effected and the pendulum would gradually cease to swing, assuming the said second contact were not provided on the pendulum. It is only when the two contacts, i. e., on the synchronous motor and on the pendulum, co-operate in such manner, that each is making contact, that the battery circuit becomes closed and the synchronous motor assumes control.

The deviation which occurs in this connection, between the re-commencement of the current and the taking over of the control by the synchronous motor can amount at the most to one-half second.

In addition to the helf-second pendulum as described there may naturally also be employed other lengths of pendulum. In each case, however, the rate of revolutions of the contact disk of the synchronous motor must coincide with the rate of oscillation of the pendulum.

In the contact disk provided on the synchronous motor the centre of gravity is disposed towards the outside so that if the current in the mains fails, the contact disk does not remain stationary in the contact position.

In place of the weight it is also possible to employ a relay of suitable construction, which is actuated by the mains and opens the battery circuit at a desired point immediately the current from the mains ceases. Since in this case the battery current is switched off by the relay the contact disk may without danger remain in the contact position when the synchronous motor stops.

A relay will conveniently be employed when using a synchronous motor which is not sufficiently powerful to overcome the turning movement due to the displacement of the centre of gravity of the contact disk upon starting.

The alternating current mains may also be employed for feeding the solenoid. In place of the magnet rod there must be employed in this case a rod of soft iron. In this embodiment displacement of the centre of gravity of the contact disk of the synchronous motor or the use of a relay do naturally not apply, as when the current from the mains fails there are no other sources of current.

The invention will be described more fully with reference to the accompanying drawing, in which Fig. 1 illustrates a possible form of embodiment of the invention in the form of a diagram of connections.

Fig. 2 shows the interposition of a relay.

Fig. 3 is a part wiring diagram showing the coil 10 connected to the A. C. mains.

A self-starting synchronous motor 1 (Fig. 1) causes the operation of a contact disk 2 through the medium of the gear wheels 3 and 4. The wheels 3 and 4 are in mesh. The wheel 3 is firmly connected with the rotor of the synchronous motor 1, and the wheel 4 is firmly connected with the contact disk 2.

The revolutions performed by the contact disk in one minute require to coincide with the number of oscillations per minute on the part of the pendulum 19.

The synchronous motor 1 is connected with the lighting mains 5, which are traversed by synchronised alternating current. On the contact disk 2, which consists of insulating material, there are provided a contact strip 6 and a roller 7, which are conductively connected with each other. The wiping spring contact 8 is in constant electrical connection with the roller 7. The circuit with the battery 9 and the coil 10 is closed when the wiping spring contact 11 is in contact with the contact strip 6 and when the contacts 12 are closed—that is, when the pendulum swings in accordance with the synchronisation impulses of the coil 10.

A buffer 13 composed of elastic material, such as rubber, prevents the pendulum from performing an excessive stroke during the synchronisation, since in addition to the normal operating force delivered to the pendulum by the movement of the clock there is also the force with which the pendulum 19, i. e., the permanent magnet 14, is drawn into the coil 10.

On the wheel 4 there is provided a weight 15, which serves to ensure that upon interruption of the current from the mains the disk 2 does not stop in the contact position, and that the battery is completely disconnected.

In Fig. 1 there is illustrated the condition when the current from the mains has ceased, the motor has stopped, and the weight 15 has taken its stationary position.

In Fig. 2 there is shown diagrammatically the provision in the battery circuit of a third contact 16, which is actuated by a relay 17 connected with the alternating current mains.

So long as the alternating current mains are traversed by current the contacts 16 are closed by the relay 17. When the current in the lighting mains fails the tongue 18 of the relay is released and the contacts 16 are opened.

In the embodiment of the synchronising device employing the relay the weight 15 on the wheel 4 may be dispensed with.

Fig. 3 shows the coil 10 connected to the alternating current main instead of to the battery as in Fig. 1.

It will be understood that no limitation is made to the specific forms of embodiment illustrated in the drawing, and that numerous modifications are quite possible within the meaning of the above description and the annexed claims without departing from the spirit of the invention.

What I claim is:

1. In a control means for pendulum clocks making use of frequency-regulated alternating current, a synchronous motor, an electric circuit, a battery in said circuit, a contact device actuated by the motor and provided in the circuit, a second contact device actuated by the pendulum of the clock and provided in the circuit, a coil energized by the battery for actuating the pendulum, a relay connected with the alternating current supply, and a third contact device in said circuit and actuated by the said relay when the latter is excited by the alternating current supply.

2. A pendulum clock driven by a clockwork comprising a synchronous motor driven by a regulated frequency alternating current, a contact device rotated by the synchronous motor and arranged in a circuit with a source of current, a solenoid coil in the circuit the core of which is connected to the pendulum, a second contact device arranged in the circuit and connected to and actuated by the pendulum to prevent the operation of the synchronising means on said pendulum when the pendulum swings in a direction contrary to the direction of the synchronising impulses, and means whereby the first-mentioned contact device rotated by the synchronous motor is adapted to be moved to a contact opening position, if the alternating current should fail so that the synchronous motor comes to rest.

HELMUT JUNGHANS.